US007930091B2

(12) United States Patent
Usukura et al.

(10) Patent No.: US 7,930,091 B2
(45) Date of Patent: Apr. 19, 2011

(54) ENGINE CONTROL SYSTEM AND INITIALIZATION METHOD OF THE SAME

(75) Inventors: Yasutaka Usukura, Saitama (JP); Kenichi Machida, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 360 days.

(21) Appl. No.: 12/046,993

(22) Filed: Mar. 12, 2008

(65) Prior Publication Data

US 2008/0228376 A1 Sep. 18, 2008

(30) Foreign Application Priority Data

Mar. 15, 2007 (JP) ................................ 2007-067105

(51) Int. Cl.
*G06F 19/00* (2006.01)

(52) U.S. Cl. ........ 701/113; 701/103; 701/114; 701/115; 123/406.47

(58) Field of Classification Search .......... 701/103–105, 701/107, 110, 112–115; 123/406.11, 406.47, 123/406.53, 406.56–406.58
See application file for complete search history.

(56) References Cited

U.S. PATENT DOCUMENTS 4,664,082 A * 5/1987 Suzuki ..................... 123/406.18
4,889,095 A * 12/1989 Sogawa .................. 123/406.47
5,329,904 A * 7/1994 Kokubo et al. .......... 123/406.53
5,937,808 A * 8/1999 Kako et al. ................. 123/90.15
5,996,547 A * 12/1999 Machida et al. .............. 123/295
6,035,826 A * 3/2000 Matsuoka ................ 123/406.62
6,260,524 B1 * 7/2001 Wachi ......................... 123/90.15
6,412,455 B1 * 7/2002 Ogiso et al. ................ 123/90.11
7,140,348 B2 * 11/2006 Takeuchi et al. .............. 123/326
7,267,110 B2 * 9/2007 Tetsuka ......................... 123/491
7,527,039 B2 * 5/2009 Yamamura et al. ........... 123/476
2004/0168665 A1 * 9/2004 Hori ........................... 123/179.5
2005/0172933 A1 * 8/2005 Takeuchi et al. ......... 123/339.19
2008/0087249 A1 * 4/2008 Namari et al. ........... 123/406.58

FOREIGN PATENT DOCUMENTS

JP 2004-162543 A 6/2004

* cited by examiner

*Primary Examiner* — John T Kwon
(74) *Attorney, Agent, or Firm* — Birch, Stewart, Kolasch & Birch, LLP

(57) ABSTRACT

An engine control system and an engine control method for improving the ability to start an engine by changing the execution timings of predetermined sumchecks in ROM to shorten the time required for initialization of the system. Upon starting an ECU with a power supply supplied from an AC generator as a result of an operation of a kick starter, a CPU initialization, which includes a hardware reset and a software initialization, is executed. An ignition timing calculation sumcheck, which is required for the calculation of an ignition timing, and injection timing calculation sumcheck, which is required for the calculation of an injection timing, are not executed in a period of the software initialization. Instead, they are executed during BG (background) processing after a movement to routine processing, which upon completion of the software initialization, starts the ECU to permit driving and controlling an igniter and a fuel injector.

20 Claims, 4 Drawing Sheets

ENGINE CONTROL SYSTEM AND INITIALIZATION METHOD OF THE SAME

CROSS-REFERENCE TO RELATED APPLICATION

The present application claims priority under 35 U.S.C. §119 to Japanese Patent Application No. 2007-067105, filed Mar. 15, 2007, the entire contents of which are hereby incorporated by reference.

BACKGROUND OF THE INVENTION

1. Field of the Invention

This invention relates to an engine control system and all initialization method of the same and specifically, to an engine control system, which provides an engine with improved startability by changing the execution timings of predetermined sumchecks in ROM to shorten the time required for the initialization of the engine control system, and also to an initialization method of the same.

2. Description of Background Art

There has been known over years a construction that, in a vehicle in which an engine is started by rotating a crankshaft with a kick starter, an engine control system which drives and controls an igniter and a fuel injector is started by electric power generated by an AC generator rotated as a result of an operation of the kick starter.

In particular, Japanese Patent Laid-open No. 2004-162543 discloses that when an AC generator is rotated as a result of an operation of a kick starter and a supply voltage to an FI-ECU (fuel injection/engine control unit), which drives and controls a fuel injector, rises to a predetermined value, a reset and initialization of the FI-ECU are executed, and upon completion of these reset and initialization, the FI-ECU is brought into a started state that permits driving and controlling the fuel injector.

With the technology of Japanese Patent Laid-open No. 2004-162543, all initializations, such as an initialization required for the detection of crank pulses and an initialization required for the calculation of a fuel injection timing, are executed in a period in which an initialization of an FI-ECU is executed, specifically in a period of a software initialization including sumchecks of ROM. According to this setting, the fuel injector cannot be driven and controlled until all the initializations are completed. If the time required for the initializations is long, for example, the start of a drive of the fuel injector may be delayed and the rotation speed of a crankshaft driven by a kick starter may drop with time to a level lower than that enabling a start up of an engine. This could reduce the ability to start the engine.

SUMMARY AND OBJECTS OF THE INVENTION

An object of the present invention is, therefore, to solve the above-described problem of the existing art, and to provide an engine control system, which provides an engine with improved startability by changing the execution timings of predetermined sumchecks in ROM to shorten the time required for the initialization of the engine control system, and also an initialization method of the same.

To achieve the above-described object, according to a first aspect of the present invention, an engine control system for driving and controlling an igniter and fuel injector of an engine is constructed such that, when a start-up power supply is fed to start the engine control system, the engine control system executes a CPU initialization including a hardware reset and a software initialization. At a time of the software initialization to be executed subsequent to the hardware reset, the engine control system executes at least an initial check for crank pulse detection and processing, which is required for the detection and processing of crank pulses, and an initial check for background processing, which is required for the background processing, out of plural initial checks to be executed on ROM. Then, subsequent to an output of an enabling interrupt that enables a start of the crank pulse detection and processing, the engine control system moves to routine processing that permits the drive and control of the igniter and fuel injector of the engine. Then, at a time of the background processing to be executed during the routine processing, the engine control system executes a remaining initial check for ignition timing calculation, which is required for the calculation of an ignition timing for the igniter and a remaining initial check for fuel injection timing calculation, which is required for the calculation of an injection timing for the fuel injector, out of the plural initial checks for the ROM.

According to a second aspect of the present invention, the initial checks for the ROM are sumchecks.

According to a third aspect of the present invention, the background processing is a processing that executes inputs of output signals from plural sensors which detect a state of the engine.

According to a fourth aspect of the present invention, the initial check for ignition timing calculation is executed before the calculation of the ignition timing is executed, and the initial check for injection timing calculation is executed before the calculation of the injection timing.

According to a fifth aspect of the present invention, a capacitor for storing electric power generated by all AC generator is provided, and the AC generator is rotationally driven as a result of an operation of a kick starter and the start-up power supply is fed from the capacitor in which electric power generated by the rotational drive is stored.

Effects of the Invention Include the Following:

According to the first aspect of the present invention, the engine control system is constructed such that, when a start-up power supply is fed to start the engine control system, the engine control system executes a CPU initialization including a hardware reset and a software initialization. At a time of the software initialization to be executed subsequent to the hardware reset, the engine control system executes at least an initial check for crank pulse detection and processing, which is required for the detection and processing of crank pulses, and an initial check for background processing, which is required for the background processing, out of plural initial checks to be executed on ROM. Then, subsequent to an output of an enabling interrupt that enables a start of the crank pulse detection and processing, the engine control system moves to routine processing that permits the drive and control of the igniter and fuel injector of the engine. Then, at a time of the background processing to be executed during the routine processing, the engine control system executes a remaining initial check for ignition timing calculation, which is required for the calculation of an ignition timing for the igniter, and a remaining initial check for fuel injection timing calculation, which is required for the calculation of an injection timing for the fuel injector, out of the plural initial checks for the ROM.

It is, therefore, possible to shorten the time, which is required for a start of the engine control system, by as much as that would otherwise be required if the initial check for ignition timing calculation and the initial check for injection timing calculation were executed at the time of the software initialization. As a result, the fuel injector is allowed to start earlier so that fuel can be positively injected at a timing that permits a fuel injection at first after the start of rotation of the crankshaft upon starting the engine. It is, therefore, possible to obtain an engine control system which can improve the ability to start the engine.

According to the second of the present invention, the initial checks for the ROM are sumchecks. It is, therefore, possible to execute the verification of programs and preset data, which are required for respective processing steps to be executed by the CPU, at the time of the initial checks.

According to the third aspect of the present invention, the background processing is a processing that executes inputs of output signals from plural sensors which detect a state of the engine. It is, therefore, possible to reduce the chance of inputs of output signals which do not change much in a short time (for example, several mS) and instead, to execute the initial check for ignition timing calculation and the initial check for injection timing calculation.

According to the fourth aspect of the present invention, the initial check for ignition timing calculation is executed before the calculation of the ignition timing is executed, and the initial check for injection timing calculation is executed before the calculation of the injection timing. It is, therefore, possible to execute the ignition timing calculation and injection timing calculation without delay, and to obtain an adequate ignition timing and injection timing from an early stage.

According to the fifth aspect of the present invention, a capacitor for storing electric power generated by an AC generator is provided, and the AC generator is rotationally driven as a result of an operation of a kick starter and the start-up power supply is fed from the capacitor in which electric power generated by the rotational drive is stored. Even under a situation that the time from a start of a kick operation until a first injection timing is short owing to the performance of compression top dead center positioning before the kick operation when the engine control system is started by electric power generated by a kick operation, an injection at the first injection timing becomes feasible. This further improves the ability to start the engine.

According to a sixth aspect of the present invention, it is possible to shorten the time, which is required for a start of the engine control system, as much as that would otherwise be required if the sumcheck for ignition timing calculation and the sumcheck for injection timing calculation were executed at the time of the software initialization. As a result, the fuel injector is allowed to start earlier so that fuel can be surely injected at a timing that permits a fuel injection at first after the start of rotation of the crankshaft upon starting the engine. It is, therefore, possible to obtain an engine control system that further improves ability to start the engine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
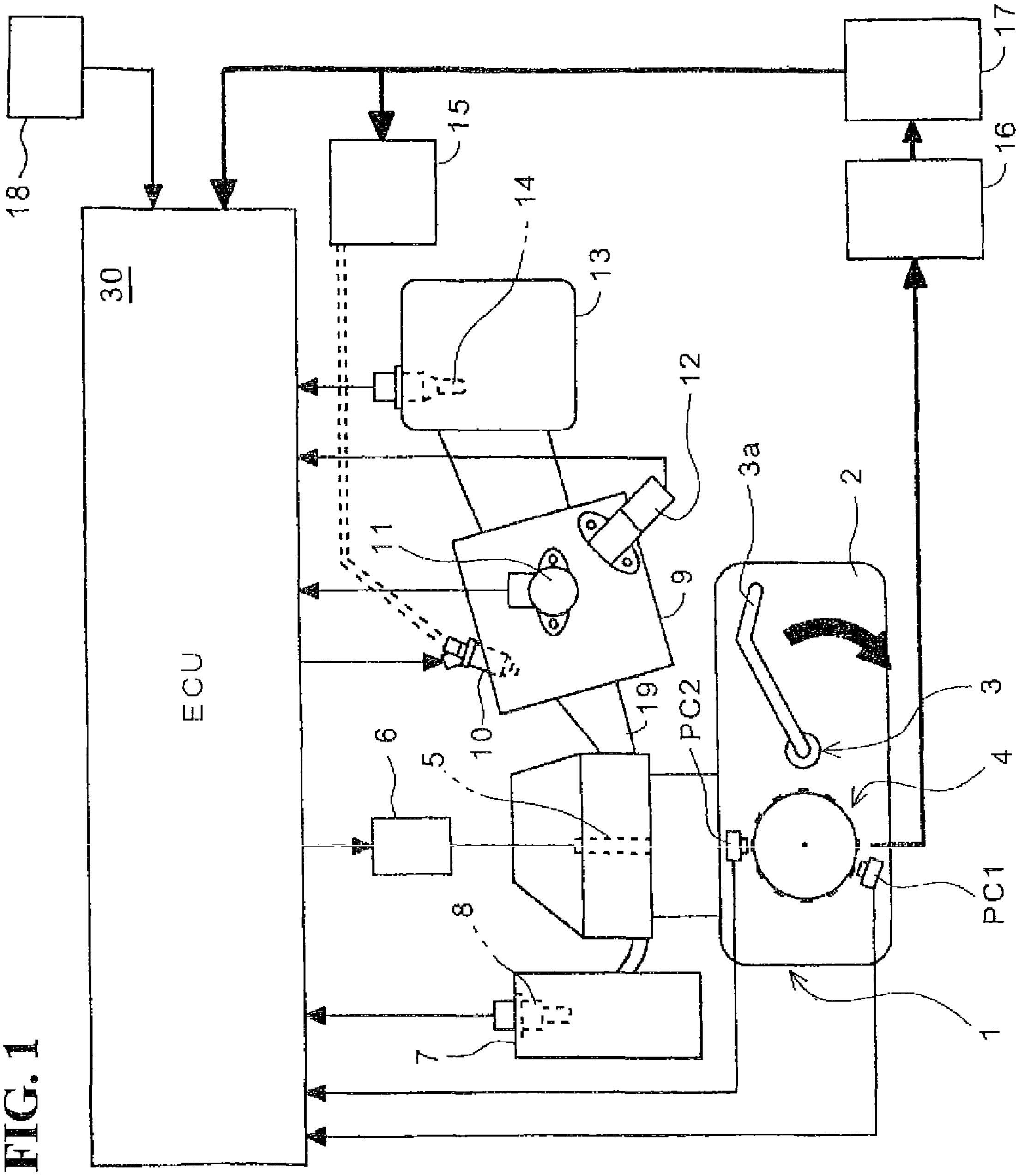
FIG. 1 is a block diagram showing the construction of an engine, which is provided with an engine control system according to one embodiment of the present invention, and its associated equipment.

With reference to the drawings, preferred embodiments of the present invention will hereinafter be described in detail. FIG. 1 is a block diagram showing the construction of an engine, which is provided with an engine control system according to one embodiment of the present invention, and its associated equipment. The engine 1 as an internal combustion engine is a 4-cycle single-cylinder engine having a known intake and exhaust valve mechanism. The engine 1 is provided with a kick starter 3 as a starter that drives an crankshaft (not shown) by human power. When a kick pedal 3*a* arranged extending out from a crankcase 2 is moved down, the crankshaft can be rotated one to several times. It is to be noted that the number of rotations of the crankshaft by a single kick operation varies depending on the manner of the operation of the kick pedal 3*a*.

Mounted on all end position of the crankshaft is an AC generator 4. Electric power generated as a result of rotation of the crankshaft is stored in a capacitor 17 via a regulator 16, and is fed to various electrical components from the capacitor 17. It is to be noted that a ripple absorbing capacitor, which reduces waveform variations of a DC voltage and stabilizes the supply voltage, is suited as the capacitor 17. Mounted in the proximity of the AC generator 4 are pickup coils PC1, PC2 to detect a crank angle of the crankshaft based on a rotation angle of the AC generator 4. A spark plug 5 performs an ignition to an air-fuel mixture in a combustion chamber as a result of a drive of an igniter 6 composed of an ignition coil. A radiator 7 which cools an engine coolant by running wind is provided with a coolant temperature sensor 8.

Mounted on a throttle body 9, which is arranged on an intake pipe 19, are a fuel injector 10, a throttle opening sensor 11 and a Pb sensor 12. The fuel injector 10 injects fuel, which has been fed under pressure from a fuel tank by a fuel pump 15, at a predetermined timing from above an intake valve (not shown). The throttle valve (not shown) changes the cross-sectional area of the intake pipe 19. The throttle opening sensor 11 detects a rotation angle of the throttle valve. The Pb sensor 12 detects a negative pressure which occurs in the intake pipe 19. On all upstream side of the throttle body 9, an air cleaner box 13 is arranged to filter and introduce ambient air, and inside the air cleaner box 13, an intake air temperature sensor 14 is arranged.

ECU 30 as an engine control system is started responsive to the feeding of a predetermined starting supply voltage from the capacitor 17, and drives and controls the fuel injector 10 and igniter 6 based on output signals from the pickup coils PC1, PC2, coolant temperature sensor 8, throttle opening sensor 11, Pb sensor 12 and intake air temperature sensor 14.

As has been described above, the start-up of the engine 1 is performed by the kick starter 3. As the engine 1 is not equipped with any vehicle-mounted power source such as a battery (in other words, the power-source is a so-called battery-less system), ECU 30 is not started even when the engine is brought into a startable state, for example, by turning on an ignition switch. ECU 30 is, therefore, started by electric power generated by the AC generator 4 which rotates as a result of an operation of the kick starter 3. About the details of various processing steps when a predetermined starting supply voltage is fed to ECU 30 and ECU 30 is started, a description will be made subsequently herein.

ECU 30 is constructed such that an output signal can be inputted therein from a kill switch 18 mounted on a left handle bar or the like of a motorcycle having the engine 1 as a power source. When the kill switch 18 is operated during an operation of the engine 1, ECU 30 can stop the engine 1 by stopping the drive of the fuel injector 1 and igniter 6. According to the construction as described above, a current which flows into the kill switch 18 can be substantially reduced compared with the method that arranges a switch, which directly connects or disconnects a circuit, on a power supply line to ECU and operates the switch to cut off the feeding of the power supply to ECU and to stop an engine. As a consequence, the construction and layout freedom of a kill switch can be increased.

Figure 2:
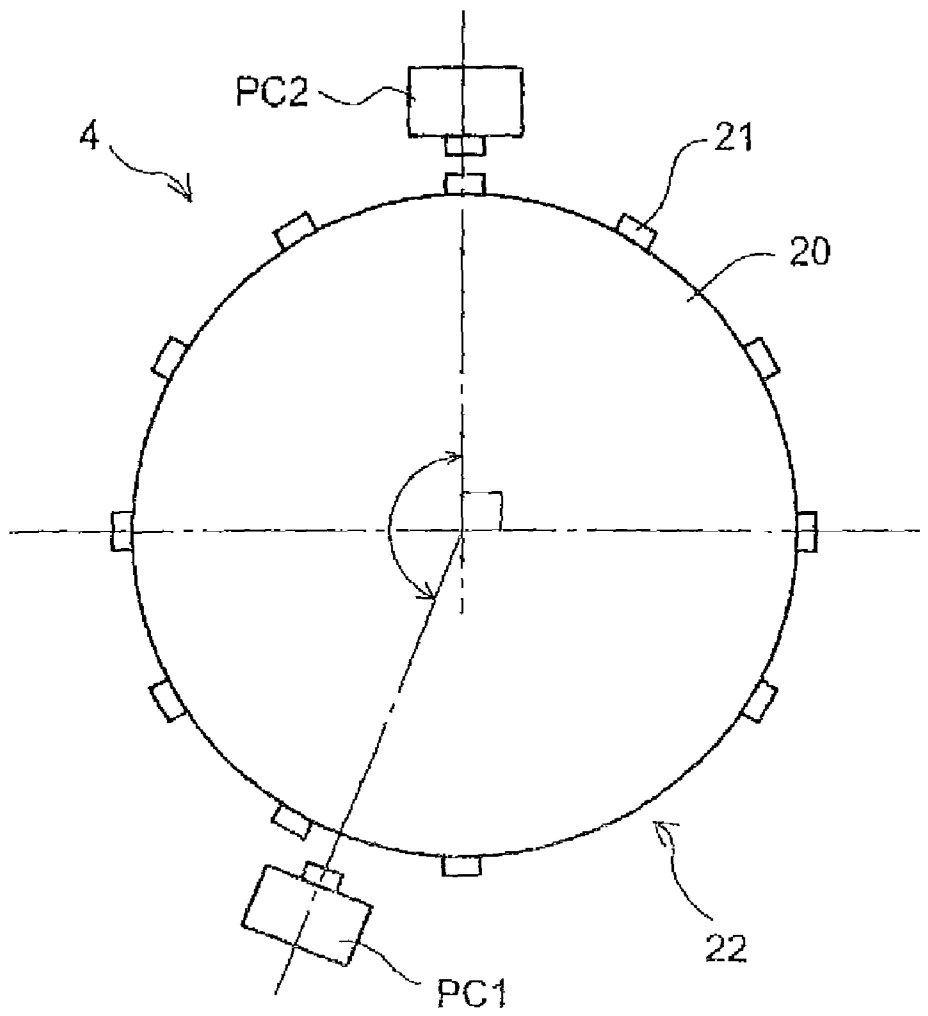
FIG. 2 is an enlarged schematic view of an AC generator.

FIG. 2 is an enlarged schematic view of the AC generator 4. The AC generator 4 in this embodiment is an AC generator that performs power generation by rotation of a cylindrical magnet-mounted cover 20, as a rotor rotatable integrally with the crankshaft, outside and around stator-side coils (not shown). In this embodiment, the AC generator includes eleven protuberances 21 are arranged at intervals of 30 degrees on an outer circumference of the cover 20 other than a protuberance-free portion 22. Pulse signals produced as a result of passage of the protuberances 21 are detected by the pickup coils PC1, PC2 arranged at a contained angle of 157.7 degrees to permit the determination of a crank angle of the crankshaft in a short time. Accordingly, the crank angle of the crankshaft is determined at a time point of detection of the passage of the protuberance-free portion 22, by either the pickup coil PC1 or the pickup coil PC2. When an output signal from the Pb sensor 12 is taken into consideration at the same time, an engine stroke (intake stroke, combustion and expansion stroke, or the like) can also be determined. It is to be noted that the number and positions of protuberances, the fixed positions of the pickup coils, and the like are not limited to this embodiment but can be varied or modified in various ways.

Figure 3:
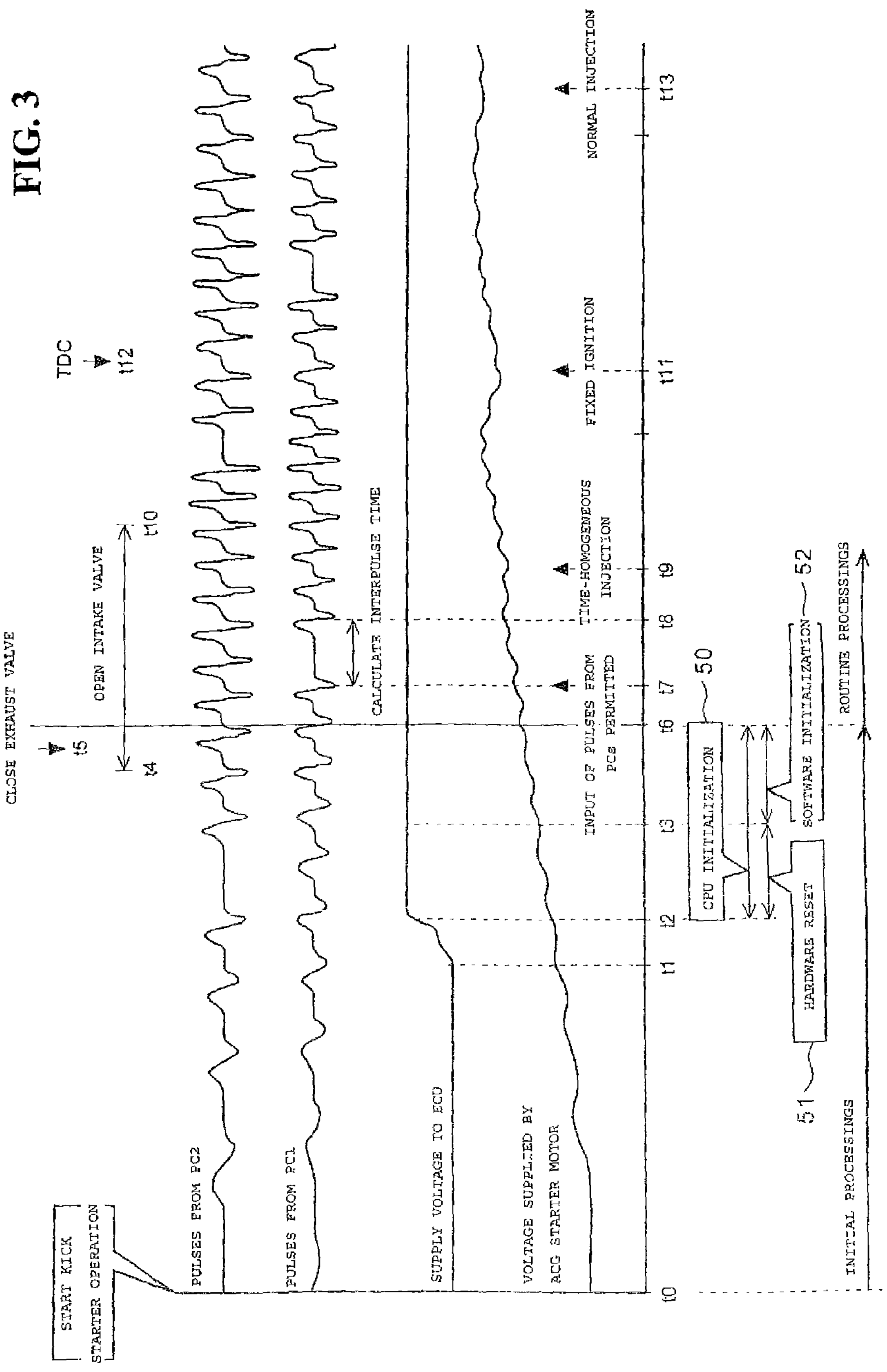
FIG. 3 is a time chart illustrating various operations upon starting an engine by a kick starter.

FIG. 3 is a time chart showing various operations upon starting the engine by the kick starter. As described above, ECU 30 can obtain adequate drive timings for the fuel injector 10 and igniter 6 by calculations based on output signals from various sensors. At the time of a start-up of the engine by the kick starter 3, however, the length of time until ECU 30 starts may affect the startability of the engine because the drive and control of the fuel injector 10 and igniter 6 cannot be performed unless electric power is firstly fed to ECU 30 to start ECU.

Further, the startability of the engine by the kick starter 3 is also affected significantly by the manner of a kick operation. In general, at the time of a kick start-up, an operation that moves down the kick pedal at a stroke over its maximum rotational stroke is performed after "compression top dead center positioning" is effected to set the crank angle of the crankshaft at a position immediately before the compression top dead center. It is an object of this "compression top dead center positioning" to maximize the period until the next compression top dead center comes and to rotate the crankshaft as fast as possible by making use of a period of small rotation resistance upon passing through the compression top dead center. This time chart also assumes a case that a strong kick operation was performed after "compression top dead center positioning". A time chart upon starting up the engine 1 in accordance with this embodiment will be substantially the same as the time chart insofar as "compression top dead center positioning" is effected.

When an operation of the kick starter 3 is started at time t0, the generation of electric power by the AC generator 4 is started. No starting power supply is, however, fed immediately to ECU 30 because a certain time is needed to charge the capacitor 17 (see FIG. 1). At time t1, electric power then begins to be fed from the capacitor 17 to ECU 30. When a predetermined voltage required for a start of ECU 30 is reached at time t2, CPU initialization 50 is started as a preparation for driving and controlling the fuel injector 10 and igniter 6. The CPU initialization 50 includes a hardware reset 51 to be executed at time t2 to t3, and a software initialization 52 to be executed at time t3 to t6. ECU 30 starts upon completion of the CPU initialization 50, and the processing state moves from the initial processing to routine processing. It is to be noted that output pulses from the pickup coils PC1, PC2 or the like are not recognized by ECU 30 until ECU 30 starts.

In this time chart, the time from time t0, at which an operation of the kick pedal 3*a* is started by the execution of "compression top dead center positioning" and a strong kick operation, until time t4, at which an intake stroke is reached and an intake valve begins to open, is in a shortest state. No ignition is, however, feasible at an ignition timing reached at time t11 unless fuel is injected before time t10, at which the intake valve closes, and within a period in which fuel can be inducted into a combustion chamber. When an ignition chance is missed once, the next ignition timing will be after a rotation of 720 degrees. The speed of the crankshaft, which rotates under an inertial force, will therefore decrease, thereby reducing the possibility of achieving a start-up by a single kick operation.

To improve the startability of the engine, it is hence effective to shorten the start-up time of ECU 30 such that fuel can be surely injected at a time at which fuel injection becomes feasible at first after an operation of the kick starter 3 is started. Concerning the hardware reset 51 which executes an initialization or the like of data, the processing time is, however, determined by the hardware construction of CPU. In this embodiment, a method is applied that shortens the start-up time of ECU by changing the execution timing of an initial check of ROM to be executed in the period of a software initialization. It is to be noted that with the engine 1 according to this embodiment, the period of from time t4 to time t5 at which the exhaust valve closes becomes an overlap period.

Figures 4A, 4B:
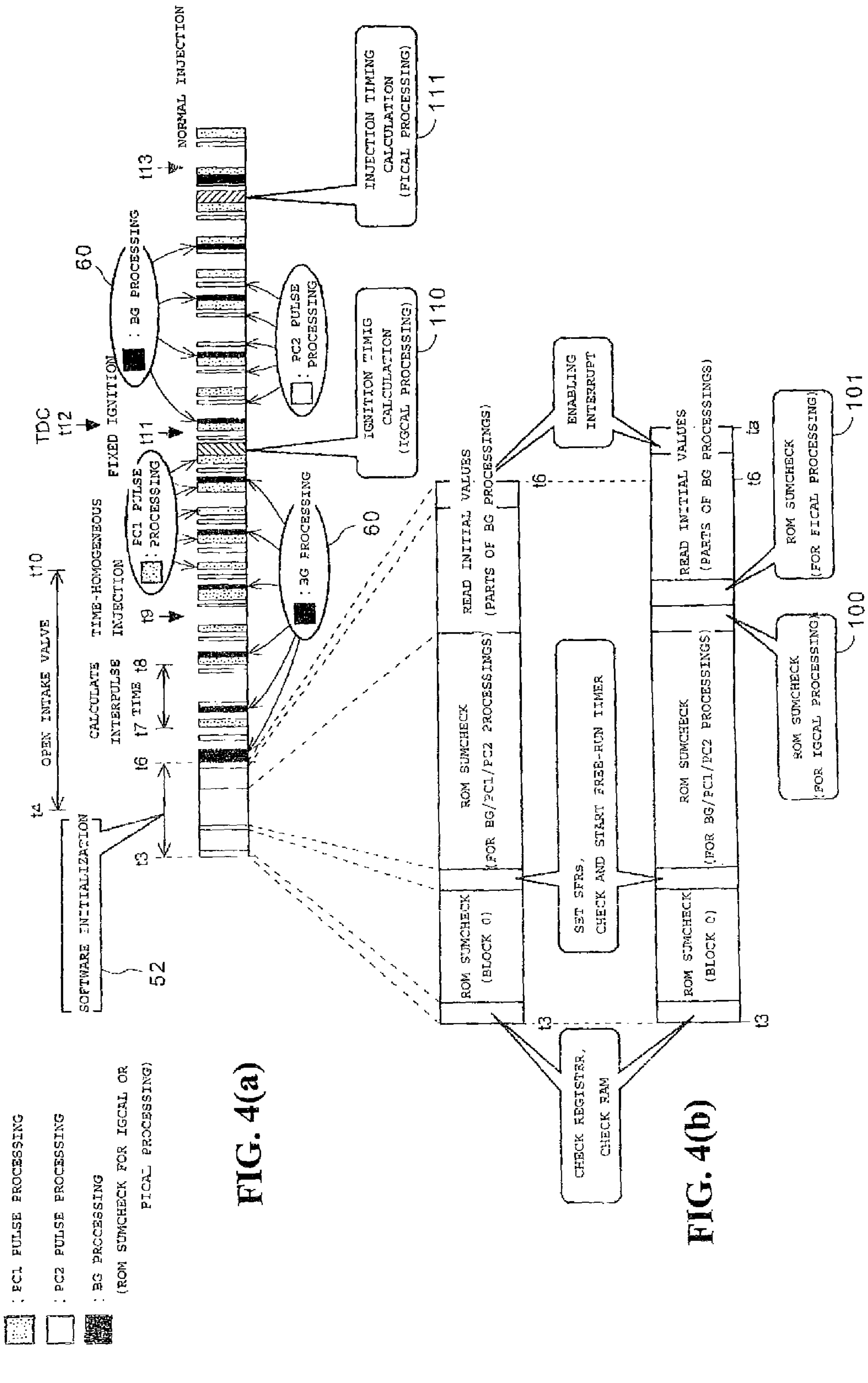
FIGS. 4(*a*) and (*b*) provide a time chart depicting the details of various processing steps executed at ECU.

FIGS. 4(*a*) and (*b*) provide a time chart showing the details of various processing steps executed at ECU 30. The same reference numerals as in the above description indicate the same or equivalent parts. FIGS. 4(*a*) and (*b*) illustrate the details of the software initialization 52 and the individual processing steps to be executed in the routine processing after the start-up of ECU 30. In FIGS. 4(*a*) and (*b*) showing breakdowns of the software initialization 52, reference is made to the FIG. 4(*b*) according to an existing method. Firstly, a check of a register as a calculation area and a check of RAM as a storage area for calculation results are executed. These checks are both to confirm whether or not "1" state and "0" state surely switch to each other in a data storage area in which data are expressed by hexadecimal notation. Sumchecks are next executed as initial checks of block "0" processing ROM. The term "sumcheck" means to perform verification of a program and preset data by comparatively checking ancillary data checksums, and also means initial checks of ROM required for various processing steps to be executed by CPU.

Subsequently, setting of SFRs (Special Function Registers) for respective port inputs and outputs and the like and a free-tin timer check and start of a timer for various measurements are executed. Next BG processing sumchecks required for background (BG) processing steps that perform the input of output signals from the plural sensors and PC1 and PC2 processing sumchecks required for PC1 and PC2 processing to input crank pulses from the pickup coils PC1, PC2 are executed. An (FICAL processing sumcheck 100 required for the calculation (IGCAL processing) of an ignition tining and a FICAL processing sumcheck 101 required for the calculation (FICAL processing) of an injection timing are then executed. Upon completion of reading of initial values from the various sensors as parts of the BG processing, an enabling interrupt which enables an interrupt of crank pulse inputs as start triggers for the respective processing steps is outputted to end the software initialization.

Comparing the time of completion of the above-described software initialization by the existing method with the completion time t6 in this embodiment, the former is time ta delayed by as much as that needed to execute the IGCAL processing sumcheck 100 and FICAL processing sumcheck 101. According to the existing method, there is hence the possibility that ECU may not be started until time t7 as a result of the execution of the IGCAL processing sumcheck and FICAL processing sumcheck at the the of the software initialization. Unless ECU 30 is started until time t7, the passage of the protuberance-free portion 22, which takes place during time t7 to t8, cannot be detected, and further, the stroke of the engine cannot be determined, thereby making it impossible to perform a fuel injection while the intake valve is open. It is to be noted that the speed of the engine can be determined when an interpulse the from time t7 to time t8 can be calculated.

On the other hand, the initialization according to the embodiment of the present invention as shown in the FIG. 4(*a*) the IGCAL processing sumcheck 100 and FICAL processing sumcheck 101 are not needed until calculations are executed to derive the optimal ignition timing and injection timing based on output signals from various sensors and also in that, by being interested in the feasibility of a time-homogeneous injection at a fixed timing insofar as the passage of the protuberance-free portion 22 can be detected and the stroke of the engine can be determined in time t7 to t8 even when ECU 30 is brought into a started state prior to the execution of both of the sumchecks, both of the sumchecks are executed at the time of the routine processing rather than the software initialization.

Among the respective sumchecks, the BG processing sumcheck cannot be delayed till later because the parts of the BG processing are executed during the software initialization. Further, the PC1 and PC2 processing sumchecks cannot be delayed till later because the PC1 and PC2 processing sumchecks need to be completed during the software initialization to permit the execution of processing steps of pulses from the PC1 and PC2 at any time after an enabling interrupt.

According to the initialization method as described above, the startability of an engine by a kick starter can be improved because fuel can be injected with certainly in a first intake stroke after the start of ECU by reducing the sumchecks to a minimum in the software initialization to shorten the start-up time of ECU. It is to be noted that the possibility of permitting a start-up of the engine by a fixed ignition at time t11 to be reached immediately before the compression top dead center (TDC) at time t12 becomes high in this embodiment because a time-homogeneous injection is performed at time t9, at which the intake valve is open, after all interpulse time is measured at time t7 to t8 to determine the crank angle of the crankshaft and the engine stroke.

In this embodiment, the IGCAL processing sumcheck 100 and FICAL processing sumcheck 101, which were not executed during the software initialization, are successively executed during the execution of respective BG processing steps 60 subsequent to the move into the period of the routine processing. It is to be noted that as illustrated in FIGS. 4(*a*) and (*b*), the respective BG processing steps 60 are executed between PC1 processing steps and PC2 processing steps in which crank pulses are inputted from the pickup coils PC1 and PC2, respectively. If it is designed to complete the IGCAL processing sumcheck 100 before the start of an ignition timing calculation (IGCAL processing) to be executed immediately before the fixed ignition at time t11 and also to complete the FICAL processing sumcheck 101 before the start of an injection timing calculation (FICAL processing) to be executed immediately before a normal injection at time t13, the respective calculations can be executed without delay.

It is to be noted that the above-described engine control system can be applied to various engines such as ATV (all terrain vehicle) engines and generator engines, in addition to motorcycle engines. Further, the constructions of the engine, igniter fuel injector and the like and the order or the like of the individual processing steps in the software initialization are not limited to this embodiment but can be varied or modified in varies ways. For example, a recoil starter or the like may be used as all engine starter.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An engine control system for driving and controlling an igniter and fuel injector of an engine, wherein said engine control system is constructed such that, when a start-up power supply is fed to start said engine control system, said engine control system executes a CPU initialization including a hardware reset and a software initialization, at a time of said software initialization to be executed subsequent to said hardware reset, said engine control system executes an initial check for crank pulse detection and processing, which is required for the detection and processing of crank pulses, and an initial check for background processing, which is required for said background processing, out of multiple initial checks to be executed on ROM, subsequent to an output of an enabling interrupt that enables a start of said crank pulse detection and processing, said engine control system moves to routine processing that permit said driving and controlling of said igniter and fuel injector of said engine, and at a time of said background processing to be executed during said routine processing, said engine control system executes a remaining initial check for ignition timing calculation, which is required for the calculation of an ignition timing for said igniter, and a remaining initial check for fuel injection timing calculation, which is required for the calculation of an injection timing for said fuel injector, out of said multiple initial checks for said ROM, wherein the routine processing starts prior to completion of the remaining initial check for ignition timing calculation, which causes fuel to be time-homogenously injected in a first intake stroke after the CPU initialization.

2. The engine control system according to claim 1, wherein said initial checks for said ROM are sumchecks.

3. The engine control system according to claim 1, wherein said background processing is a processing that executes inputs of output signals from multiple sensors which detect a state of said engine.

4. The engine control system according to claim 2, wherein said background processing is a processing that executes inputs of output signals from multiple sensors which detect a state of said engine.

5. The engine control system according to claim 1, wherein said initial check for ignition timing calculation is executed before said calculation of said ignition timing is executed.

6. The engine control system according to claim 2, wherein said initial check for ignition timing calculation is executed before said calculation of said ignition timing is executed.

7. The engine control system according to claim 1, wherein said engine control system comprises:

a generator having a cylindrical magnet-mounted cover upon which multiple protuberances for producing crank pulses are arranged, the multiple protuberances being spaced apart from each other at equal intervals around an outer circumference of the cylindrical cover other than in a protuberance-free portion of the outer circumference, and a pair of pickup coils positioned adjacent to the cover in a manner such that a passage of the protuberance-free portion is detected by one of the pair of pickup coils when the generator is rotated, whereupon a crank angle is determined.

8. The engine control system according to claim 7, wherein said pickup coils are arranged at a contained angle of 157.7°.

9. The engine control system according to claim 1, comprising a capacitor for storing electric power generated by an AC generator, wherein said AC generator is rotationally driven as a result of an operation of a kick starter and said start-up power supply is fed from said capacitor in which electric power generated by said rotational drive is stored.

10. The engine control system according to claim 2, comprising a capacitor for storing electric power generated by an AC generator, wherein said AC generator is rotationally driven as a result of an operation of a kick starter and said start-up power supply is fed from said capacitor in which electric power generated by said rotational drive is stored.

11. The engine control system according to claim 3, comprising a capacitor for storing electric power generated by an AC generator, wherein said AC generator is rotationally driven as a result of an operation of a kick starter and said start-up power supply is fed from said capacitor in which electric power generated by said rotational drive is stored.

12. The engine control system according to claim 4, comprising a capacitor for storing electric power generated by an AC generator, wherein said AC generator is rotationally driven as a result of an operation of a kick starter and said start-up power supply is fed from said capacitor in which electric power generated by said rotational drive is stored.

13. An initialization method of an engine control system for driving and controlling an igniter and fuel injector of an engine, comprising:

executing a CPU initialization, which includes a hardware reset and a software initialization, when a start-up power supply is fed to start said engine control system;

executing an initial check for crank pulse detection and processing, which is required for the detection and processing of crank pulses, and an initial check for background processing, which is required for said background processing, out of multiple initial checks, which are to be executed on ROM, at a time of said software initialization to be executed subsequent to said hardware reset;

moving to routine processing, which permit said drive and control of said igniter and fuel injector of said engine, subsequent to an output of an enabling interrupt that enables a start of said crank pulse detection and processing; and executing a remaining initial check for ignition timing calculation, which is required for the calculation of an ignition timing for said igniter, and a remaining initial check for fuel injection timing calculation, which is required for the calculation of an injection timing for said fuel injector, out of said multiple initial checks for said ROM at a time of said background processing to be executed during said routine processing, wherein the routine processing starts prior to completion of the remaining initial check for ignition timing calculation, which causes fuel to be time-homogenously injected in a first intake stroke after the CPU initialization.

14. An engine control system for driving and controlling an igniter and fuel injector of an engine, comprising:

an ECU capable being started responsive to a feeding of a predetermined starting supply voltage from a capacitor, wherein the ECU is adapted to perform steps of an initialization method, including the steps of:

executing a CPU initialization, which includes a hardware reset and a software initialization, when a start-up power supply is fed to start said engine control system;

executing an initial check for crank pulse detection and processing, which is required for the detection and processing of crank pulses, and an initial check for background processing, which is required for said background processing, out of multiple initial checks, which are to be executed on ROM, at a time of said software initialization to be executed subsequent to said hardware reset;

moving to routine processing, which permit said drive and control of said igniter and fuel injector of said engine, subsequent to an output of an enabling interrupt that enables a start of said crank pulse detection and processing; and executing a remaining initial check for ignition timing calculation, which is required for the calculation of an ignition timing for said igniter, and a remaining initial check for fuel injection timing calculation, which is required for the calculation of an injection timing for said fuel injector, out of said multiple initial checks for said ROM at a time of said background processing to be executed during said routine processing, wherein the routine processing starts prior to completion of the remaining initial check for ignition timing calculation, thereby causing fuel to be time-homogenously injected in a first intake stroke after the CPU initialization.

15. The engine control system according to claim 14, wherein said initial checks for said ROM are sumchecks.

16. The engine control system according to claim 14 wherein said background processing is a processing that executes inputs of output signals from multiple sensors which detect a state of said engine.

17. The engine control system according to claim 15, wherein said background processing is a processing that executes inputs of output signals from multiple sensors which detect a state of said engine.

18. The engine control system according to claim 14, wherein said initial check for ignition timing calculation is executed before said calculation of said ignition timing is executed.

19. The engine control system according to claim 14, wherein said engine control system comprises:

a generator having a cylindrical magnet-mounted cover capable of producing crank pulses at equal intervals around an outer circumference of the cylindrical cover other than in a crank-pulse-free portion of the outer circumference, a pair of pickup coils positioned adjacent to the cover in a manner such that a passage of the crank-pulse-free portion is detected by one of the pair of pickup coils when the generator is rotated, whereupon a crank angle is determined.

20. The engine control system according to claim 19, wherein said pickup coils are arranged at a contained angle of 157.7°.

* * * * *